United States Patent
Park et al.

(10) Patent No.: US 10,187,282 B2
(45) Date of Patent: Jan. 22, 2019

(54) SYSTEM AND METHOD FOR MODEM MANAGEMENT BASED ON KEY PERFORMANCE INDICATORS

(71) Applicant: QUALCOMM INCORPORATED, San Diego, CA (US)

(72) Inventors: Hee Jun Park, San Diego, CA (US); Alex Tu, San Diego, CA (US); James Francis Geekie, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/873,154

(22) Filed: Oct. 1, 2015

(65) Prior Publication Data
US 2017/0099204 A1  Apr. 6, 2017

(51) Int. Cl.
*H04L 12/26* (2006.01)
*G06F 1/20* (2006.01)

(52) U.S. Cl.
CPC .......... *H04L 43/0888* (2013.01); *G06F 1/203* (2013.01); *G06F 1/206* (2013.01); *H04L 43/0894* (2013.01)

(58) Field of Classification Search
CPC ... Y02B 60/50; Y02B 60/1292; G06F 9/4893; G06F 1/3212; G06F 1/3287; G06F 1/329; G06F 1/203; G06F 1/206; H04W 24/04; H04W 52/0209; H04W 52/0225; H04W 52/0216; H04W 52/0229; H04W 52/0235; H04W 52/0248; H04W 52/0261;
(Continued)

(56) References Cited

U.S. PATENT DOCUMENTS 8,244,296 B2   8/2012   Dorsey et al.
8,645,732 B2   2/2014   Naware et al.
(Continued)

FOREIGN PATENT DOCUMENTS

JP   2014-216909   * 11/2014

OTHER PUBLICATIONS

International Search Report and Written Opinion—PCT/US2016/050102—ISA/EPO—dated Nov. 21, 2016
(Continued)

*Primary Examiner* — Sophia Vlahos
(74) *Attorney, Agent, or Firm* — Smith Tempel Blaha LLC

(57) ABSTRACT

Various embodiments of methods and systems for modem management in a portable computing device are disclosed. An exemplary method recognizes an input of a key performance indicator ("KPI") from a plurality of performance indicators. Based on the key performance indicator either manually by a user or automatically based on system status information, the exemplary method determines a particular modem management and control strategy designed to optimize performance of the modem based on the key performance indicator. The determined modem management and control strategy is implemented to cause adjustment of a modem performance level such that the key performance indicator is optimized. Exemplary KPIs include, lower device temperature, maximization of the percentage of time that the modem is operating at a maximum advertised LTE speed, maximization of the average data throughput, maximization of battery life, and minimizing LTE speed transitions over time.

22 Claims, 9 Drawing Sheets

(58) Field of Classification Search
CPC ......... H04W 52/0264; H04W 52/0274; H04W 52/0277; H04W 52/028; H04W 52/022; H04W 52/0241; H04W 52/0245; H04L 43/0888; H04L 43/0894; H04B 1/036
See application file for complete search history.

(56) References Cited

U.S. PATENT DOCUMENTS

| | | |
|---|---|---|
| 9,055,470 B2 | 6/2015 | Sahu et al. |
| 2002/0173858 A1 | 11/2002 | Sherlock |
| 2008/0114721 A1* | 5/2008 | Jones ................. G06Q 30/0254 |
| 2008/0287080 A1* | 11/2008 | Camp, Jr. ............. H04B 1/406 455/127.5 |
| 2012/0155407 A1* | 6/2012 | Lindoff ................... H04L 5/001 370/329 |
| 2012/0179303 A1 | 7/2012 | Anderson et al. |
| 2012/0281628 A1* | 11/2012 | Park .................... H04J 11/0079 370/328 |
| 2013/0198541 A1* | 8/2013 | Rabii ....................... G06F 1/26 713/320 |
| 2013/0258936 A1* | 10/2013 | Choi ................. H04W 72/0453 370/312 |
| 2013/0311803 A1* | 11/2013 | Wang .................... G06F 1/3212 713/320 |
| 2014/0077879 A1* | 3/2014 | Naeini .................... H03F 1/086 330/255 |
| 2014/0200685 A1 | 7/2014 | Ngai et al. |
| 2014/0245028 A1 | 8/2014 | Chen et al. |
| 2014/0245032 A1 | 8/2014 | Vadakkanmaruveedu et al. |
| 2015/0029917 A1* | 1/2015 | Kim .................. H04W 52/0209 370/311 |
| 2015/0092709 A1* | 4/2015 | Su ......................... H04W 48/16 370/329 |
| 2015/0153810 A1* | 6/2015 | Sasidharan ........... G06F 1/3212 713/320 |
| 2015/0172032 A1* | 6/2015 | Khay-Ibbat ........... H04L 5/0057 370/329 |
| 2015/0282156 A1* | 10/2015 | Fang ........................ H03L 1/02 455/509 |

OTHER PUBLICATIONS

Shang L., et al., "Temperature-Aware On-Chip Networks", May 10, 2006 (May 10, 2006), XP055121611, pp. 130-139, Retrieved from the Internet: URL:http://projects.csail.mit.edu/wiki/pub/LSPgroup/PublicationList/thermalherd_toppicks.pdf[retrieved on Jun. 4, 2014].

* cited by examiner

SYSTEM AND METHOD FOR MODEM MANAGEMENT BASED ON KEY PERFORMANCE INDICATORS

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs today often leverage long term evolution ("LTE") broadband wireless technologies to support roaming Internet access over a cellular network. PCDs use their LTE capabilities for delivering web browsing, voice over Internet Protocol ("VoIP") services and other IP-related functionality to PCD end users. Along with "WiMax," LTE broadband is sometimes referred to as a fourth generation ("4G") technology.

To actually employ LTE-based wireless communications, a PCD uses a modem, as would be understood by one of ordinary skill in the art. To deliver the highest data transfer rate possible, some PCD modems work to aggregate available LTE bandwidth on the cellular network from multiple carriers. In this way, modern day modems found in PCDs are able to maximize a quality of service ("QoS") level delivered to a user, at least as such QoS is measured by a data rate.

The tradeoff for maximized data throughput with an LTE capable modem is that the resulting operating temperature may exceed the safe temperature limits of the silicon junctions in the modem. Consequently, prior art methods for modem management tend to back down a modem's data rate throughput only when a temperature threshold is exceeded. In this way, the modem is allowed to cool until the operating temperature reaches a level that justifies a renewed increase in the data rate.

Prior art modem management methods adjust modem processing speeds in view of operating temperature only. As such, prior art modem management methods fail to optimize a QoS level as it may be measured by any performance indicator other than device temperature. The result of prior art modem management methods is that a user experience of the PCD may not be optimized when the modem operating temperature is safely below a critical threshold. Accordingly, what is needed in the art is a method and system for modem management based on key performance indicators other than operating temperature alone.

SUMMARY OF THE DISCLOSURE

Various embodiments of methods and systems for modem management in a portable computing device are disclosed. An exemplary method recognizes an input of a key performance indicator ("KPI") from a plurality of performance indicators. While modems, like most any processing component residing on a SoC, may be managed and controlled based on a temperature threshold, maintaining a modem's operating temperature below a certain critical threshold may not provide the optimum quality of service level from a user's standpoint. As such, the exemplary method determines a particular modem management and control strategy designed to optimize performance of the modem based on the key performance indicator. The determined modem management and control strategy is implemented to cause adjustment of a modem performance level such that the key performance indicator is optimized.

It is envisioned that modems operable for aggregation of LTE carrier bandwidths may be particularly suitable for management and control via a KPI-based strategy. Exemplary KPIs include, but are not limited to, lower device temperature, maximization of the percentage of time that the modem is operating at a maximum advertised LTE speed, maximization of the average data throughput (such as during the download or upload of a large file or application), maximization of battery life (such as for energy efficiency in download or upload of a large file or application), minimizing LTE speed transitions over a duration (such as to minimize frequency that the modem transitions from one LTE mode to another), etc.

It is further envisioned that KPIs may be manually selectable by a user based on user preference or, in some embodiments, the KPI may be automatically selected based on one or more system status data. It is envisioned that certain embodiments of the solution, for more accurate thermal control and energy consumption calculation, may utilize part-specific information such as per-part leakage and operating voltage. System status information that may be used by certain embodiments to determine an optimal KPI-based modem management strategy includes, but is not limited to, modem performance mode, data rate, use cases, running applications, on/off status of display component, remaining battery capacity, temperature sensor readings, channel bands used, receiving or transmitting signal strength, etc.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
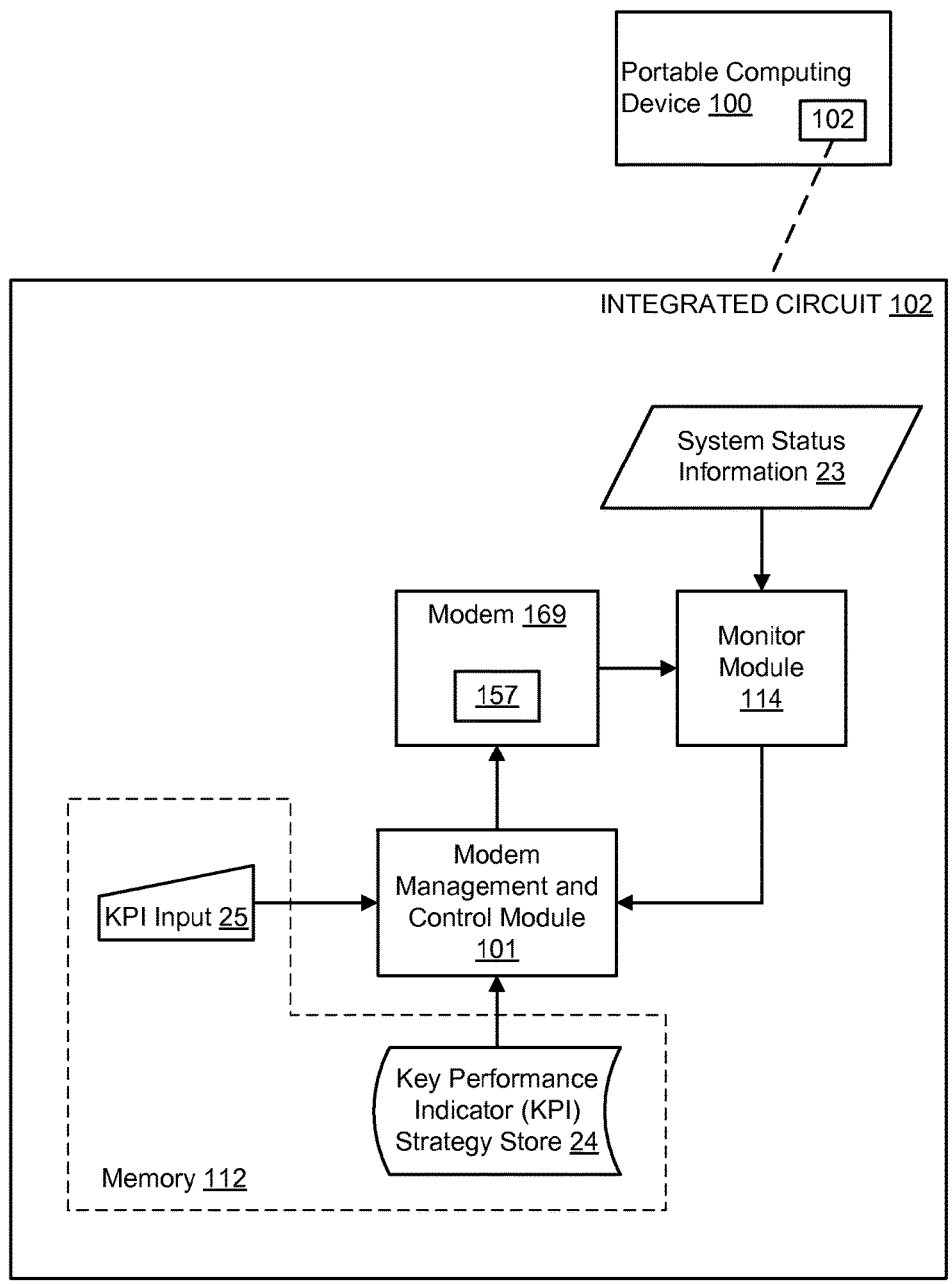
FIG. 1 is a functional block diagram illustrating an embodiment of an on-chip system for modem management in a portable computing device ("PCD") using key performance indicators ("KPI")

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are non-limiting examples of processing components that may reside in a PCD and are used interchangeably except when otherwise indicated. Moreover, as distinguished in this description, a CPU, DSP, or a chip may be comprised of one or more distinct processing components generally referred to herein as "core(s)" and "sub-core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the term "modem" refers to a processing component in a system on a chip that is operable to modulate and demodulate signals transmitted over a cellular communications network. Certain embodiments of the solution envision management of a modem configured for long term evolution ("LTE") wireless broadband (e.g., LTE cat 6, cat 7, cat 9, cat 11, LTE-U, etc.) and operable to aggregate a plurality of LTE bandwidths associated with a plurality of respective carriers on a cellular communications network. As one of ordinary skill in the art would understand, the particular number of carrier bandwidths that may be aggregated by a given modem (thereby maximizing total bandwidth available) at any given time may be dictated by the nearest evolved node B component ("eNodeB" or "eNB") in the cellular network. As would further be understood by one of ordinary skill in the art, an eNodeB is an element of an LTE Radio Access Network, or E-UTRAN. Reference to an eNodeB in this description also envisions an HeNB that essentially performs the same function of an eNodeB, but is optimized for deployment for smaller coverage ranges, such as indoor premises and public hotspots.

In this description, the term "portable computing device" ("PCD") is used to describe any device operating on a limited capacity power supply voltage and clock generator frequency, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD in this description may be any device equipped with a modem such as, but not limited to, a cellular telephone, a satellite telephone, a pager, a PDA, a smartphone, a navigation device, a smartbook or reader, a media player, a combination of the aforementioned devices, and a laptop computer with a wireless connection.

Consumer demand for increased data processing capabilities in PCDs has led to the development of modems with ever increasing power consumption. The increase in power consumption brings with it the desired higher modem data rates, but it also brings with it increased thermal energy generation. The dissipation of thermal energy generated by the higher data rate capable modems is further complicated with the demand for thinner and lighter PCD form factors.

To combat the increased thermal energy generation by modems in PCDs, the industry has employed simple thermal control methods designed to manage the modem processing functionality in view of a thermal threshold. For example, an increase in a modem's operating temperature above a certain threshold may trigger a limitation of the modem's carrier aggregation functionality or, alternatively, may trigger a throttling back of the modem's data rate. In doing so, these temperature based methods of modem management reduce the workload of the modem, thereby reducing its power consumption and thermal energy generation.

Although managing a modem based on a temperature threshold may work well for maintaining the modem's operating temperature below a critical level for the silicon junctions within the modem, such methods may not optimize a quality of service ("QoS") from a PCD user's viewpoint, especially when temperature is not an issue. As such, embodiments of the solution provide for management of a modem based on key performance indicators ("KPIs") selectable by the user of a PCD or, in some embodiments, determined automatically based on system status information. In this way, embodiments of the solution seek to optimize a user experience by maximizing QoS as measured by a user-defined KPI.

Exemplary KPIs include, but are not limited to, lower device temperature, maximization of the percentage of time that the modem is operating at a maximum advertised LTE speed, maximization of the average data throughput (such as during the download or upload of a large file or application), maximization of battery life (such as for energy efficiency in download or upload of a large file or application), minimizing LTE speed transitions over a duration (such as to minimize frequency that the modem transitions from one LTE mode to another), etc.

It is envisioned that embodiments of the solution may optimize QoS from the point of view of the end user. For example, consider the scenario wherein a user purchased a PCD that supports LTE carrier aggregation cat 9 and desires to know how often and long the PCD utilizes an advertised peak modem data rate. An embodiment of the solution that manages the modem functionality in view of a peak data rate KPI may optimize the QoS experienced by the user.

As another non-limiting example, consider the scenario wherein a user is bothered by a modem's frequent LTE speed changes associated with thermal mitigation. An embodiment of the solution that manages the modem functionality in view of a stable LTE speed rate change KPI may optimize the QoS experienced by the user.

As yet another non-limiting example, consider the scenario wherein a battery capacity in a PCD is small. An embodiment of the solution that manages the modem functionality in view of an energy efficiency KPI may optimize the QoS experienced by the user.

As yet another non-limiting example, consider the scenario wherein a user is downloading a large multimedia file to a PCD. An embodiment of the solution that manages the modem functionality in view of an average data throughput KPI may optimize the QoS experienced by the user.

Embodiments of the solution provide modem management or control using selectable modem management algorithms that utilize different KPIs as triggers. Depending on a user's selection of a given KPI and/or the system status information, a modem management strategy associated with the correct KPI may be selected and executed. It is envisioned that certain embodiments of the solution, for more accurate thermal control and energy consumption calculation, may utilize part-specific information such as per-part leakage and operating voltage. System status information that may be used by certain embodiments to determine an optimal KPI-based modem management strategy includes, but is not limited to, modem performance mode, data rate, use cases, running applications, on/off status of display component, remaining battery capacity, temperature sensor readings, channel bands used, receiving or transmitting signal strength, etc.

FIG. 1 is a functional block diagram illustrating an embodiment of an on-chip system 102 for modem management in a portable computing device ("PCD") 100 using key performance indicators ("KPI"). As can be seen in the FIG. 1 illustration, a monitor module 114 monitors a modem 169 and various system status information 23 that may be used to estimate power consumption in the SoC 102 such as, but not limited to, IDDQ eFuse leakage current, Vmin eFuse operating voltage, modem data rate, carrier aggregation mode, silicon die temperature, transmission signal strength, receiving signal strength, channel band utilization, etc. In turn, the monitor module 114 communicates the monitored information to the modem management and control ("MMC") module 101.

The MMC module 101 may receive a manual input 25 from a user that dictates a key performance indicator for modem functionality or may receive an input 25 that dictates automatic selection of a KPI based on analysis of system status information. If the KPI input 25 is manually entered by a user of the PCD 100, the MMC module 101 may select a modem management algorithm from the KPI strategy store 24 that is associated with the user-selected KPI. Alternatively, if the KPI input 25 is dictated automatically, the MMC module 101 may leverage system status information and/or information associated with the modem 169 to determine an appropriate KPI. Based on the determined KPI, the MMC module 101 may select a modem management algorithm form the KPI strategy store 24 that is associated with the automatically determined KPI.

Notably, although the embodiments of the solution manage and control a modem based on the selection or identification of a KPI, it is envisioned that a given modem management algorithm may be overridden in the event that a junction temperature, such as might be measured by temperature sensor 157 and monitored by monitor module 114, exceeds a predetermined threshold. In such case, an embodiment of the solution may default to a thermal management based modem control scheme.

Figure 2:
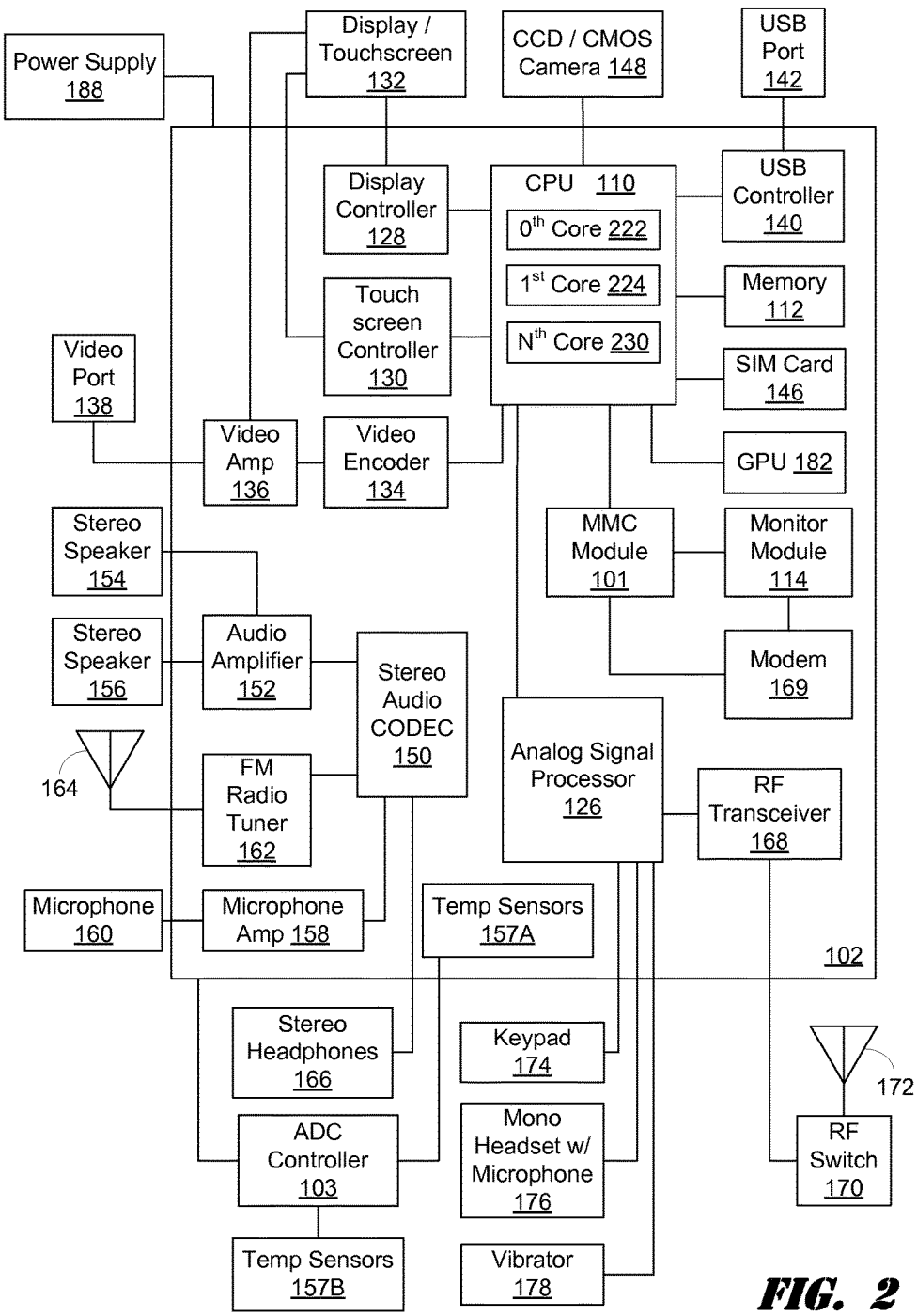
FIG. 2 is a functional block diagram of an exemplary, non-limiting aspect of a portable computing device ("PCD") in the form of a wireless telephone for implementing methods and systems for modem management using key performance indicators ("KPI")

FIG. 2 is a functional block diagram of an exemplary, non-limiting aspect of a portable computing device ("PCD") in the form of a wireless telephone for implementing methods and systems for modem management using key performance indicators ("KPI"). As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

In general, the modem management and control ("MMC") module(s) 101 may receive modem related and/or system data from the monitor module 114 and use the data to select a KPI and its associated modem management strategy. Alternatively, the MMC modules 101 may receive a manual input of a KPI and, based on that KPI, select and implement an associated modem management strategy. The monitor module 114 communicates with multiple operational sensors (e.g., thermal sensors 157) distributed throughout the on-chip system 102 and with the modem 169 of the PCD 100 as well as with the MMC module(s) 101.

As illustrated in FIG. 2, a display controller 128 and a touchscreen controller 130 are coupled to the digital signal processor 110. A touchscreen display 132 external to the on-chip system 102 is coupled to the display controller 128 and the touchscreen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touchscreen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 and/or monitor module 114 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

The MMC module(s) 101 may comprise software that is executed by the CPU 110. However, the MMC module(s) 101 may also be formed from hardware and/or firmware without departing from the scope of the invention. The MMC module(s) 101 may be responsible for querying system performance data and/or receiving indications of system performance and, based on an analysis of the data, selecting an appropriate KPI and its associated modem management strategy.

Returning to FIG. 2, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100 such as the modem 169.

In a particular aspect, one or more of the method steps described herein may be implemented by executable instructions and parameters stored in the memory 112 that form the one or more MMC module(s) 101. The instructions that form the MMC module(s) 101 may be executed by the CPU 110, the analog signal processor 126, or another processor in addition to the ADC controller 103 to perform the methods described herein. Further, the processors 110, 126, the memory 112, the instructions stored therein, or a combination thereof may serve as a means for performing one or more of the method steps described herein.

Figure 3:
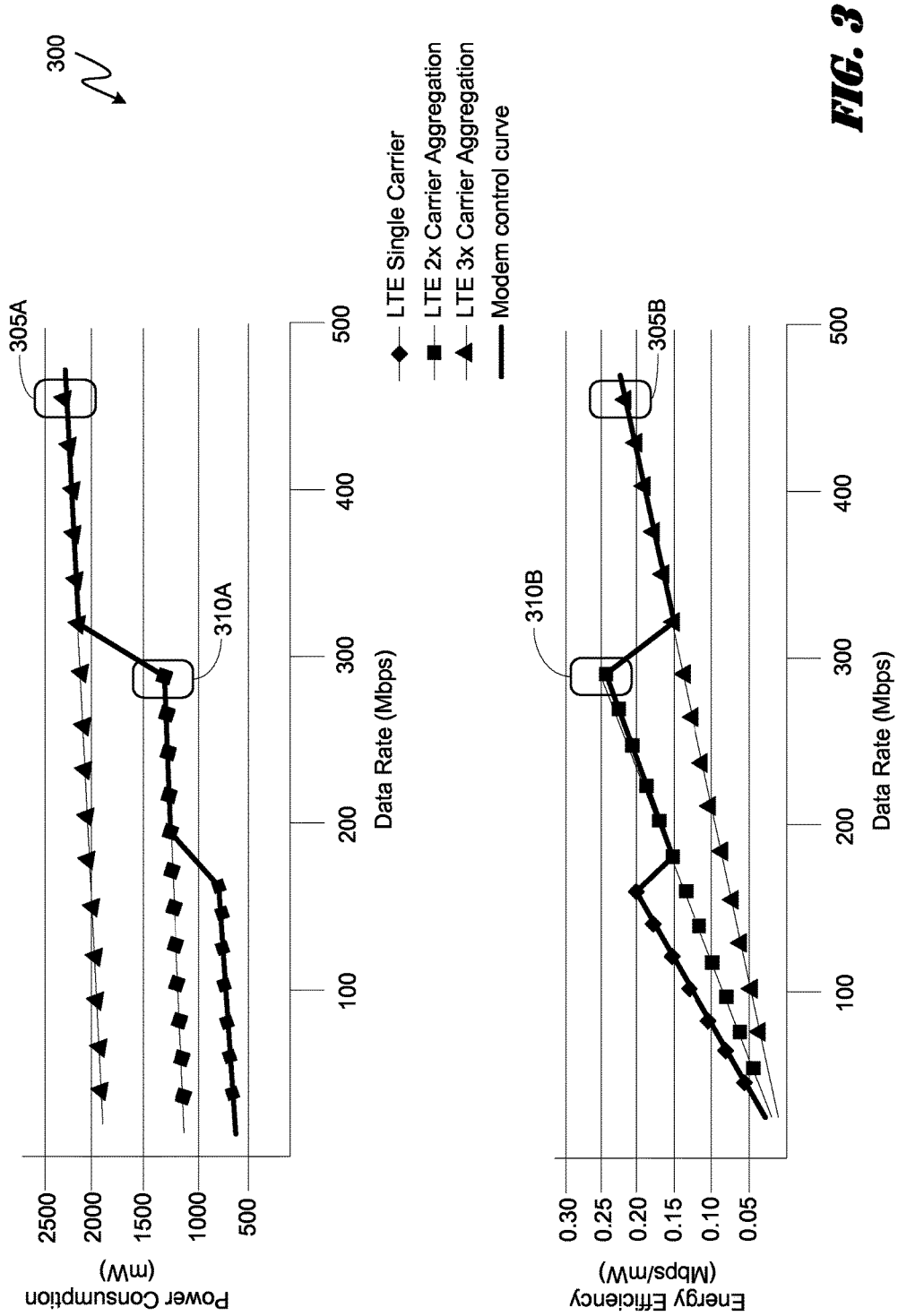
FIG. 3 is a pair of complimentary graphs illustrating an exemplary modem management strategy based on a key performance indicator ("KPI") of power/energy efficiency.

FIG. 3 is a pair of complimentary graphs 300 illustrating an exemplary modem management strategy based on a key performance indicator ("KPI") of power/energy efficiency. A KPI-based modem management strategy that controls a modem based on an energy efficiency KPI may be useful in scenarios such as, but not limited to, a low battery capacity. Low battery levels may, for example, be recognized by the monitor module 114 and trigger the MMC module 101 to implement a modem management strategy that optimizes QoS in view of the appropriate KPI. Alternatively, it is envisioned that a user may manually select the KPI in lieu of an automatic selection.

In certain embodiments, a power consumption level may be determined via a function of various system information provided to the MMC module 101 via the monitor module 114. Based on the power level, the MMC module 101 may increase or decrease the data rate and/or carrier aggregation of the modem 169 in order to maintain the PCD 100 at a certain target power level or energy efficiency. Energy efficiency (Mbps/mW) may be defined as the amount of data (Mbps) transferred by the modem 169 per unit of power (mW) consumed by the modem 169. Using energy efficiency as a KPI for a modem management strategy, an MMC module 101 may govern the modem's 169 data transfer rate under power limited circumstances such as thermal mitigation modes or limited battery capacity.

Notably, in some instances, energy efficiency for a modem 169 may be worse at low data rate scenarios while in other instances the energy efficiency may suffer at high data rates (e.g., due to high power consumption associated with multi-carrier aggregation and Turbo mode).

Referring to the graphs 300, an exemplary modem 169 may be managed by an MMC module 101 according to an energy efficiency KPI and within the bounds of the modem control curve. The top graph of FIG. 3 maps power consumption (y-axis) against data rate (x-axis) for a given LTE modem 169. The bottom graph of FIG. 3 maps energy efficiency (y-axis) against data rate (x-axis) for the same exemplary LTE modem 169. As can be understood from the upper graph, a modem management strategy according to the embodiment may drive the modem 169 to a single LTE carrier bandwidth when the data rate is low, then drive the modem 169 to a double carrier aggregation when the data rate is in a mid-range, and then cause the modem 169 to implement a triple carrier aggregation when the data rate is high. As can be seen from the upper graph, the power consumption level increases for each increase in carrier aggregation level.

Point 305 represents the highest data rate of over 400 Mbps for which the exemplary LTE modem 169 is capable. Notably, however, a modem management strategy driven by an energy efficiency KPI may drive the modem to point 310 which presents the best efficiency per data rate unit. As can be seen in the lower graph, at point 310 the exemplary LTE modem 169 achieves a highest efficiency rating of nearly 0.25 Mbps per mW of energy consumed. Consequently, the exemplary KPI-based modem management strategy illustrated in FIG. 1 may drive the data rate of the modem 169 to right at 300 Mbps (point 310).

Figure 4:
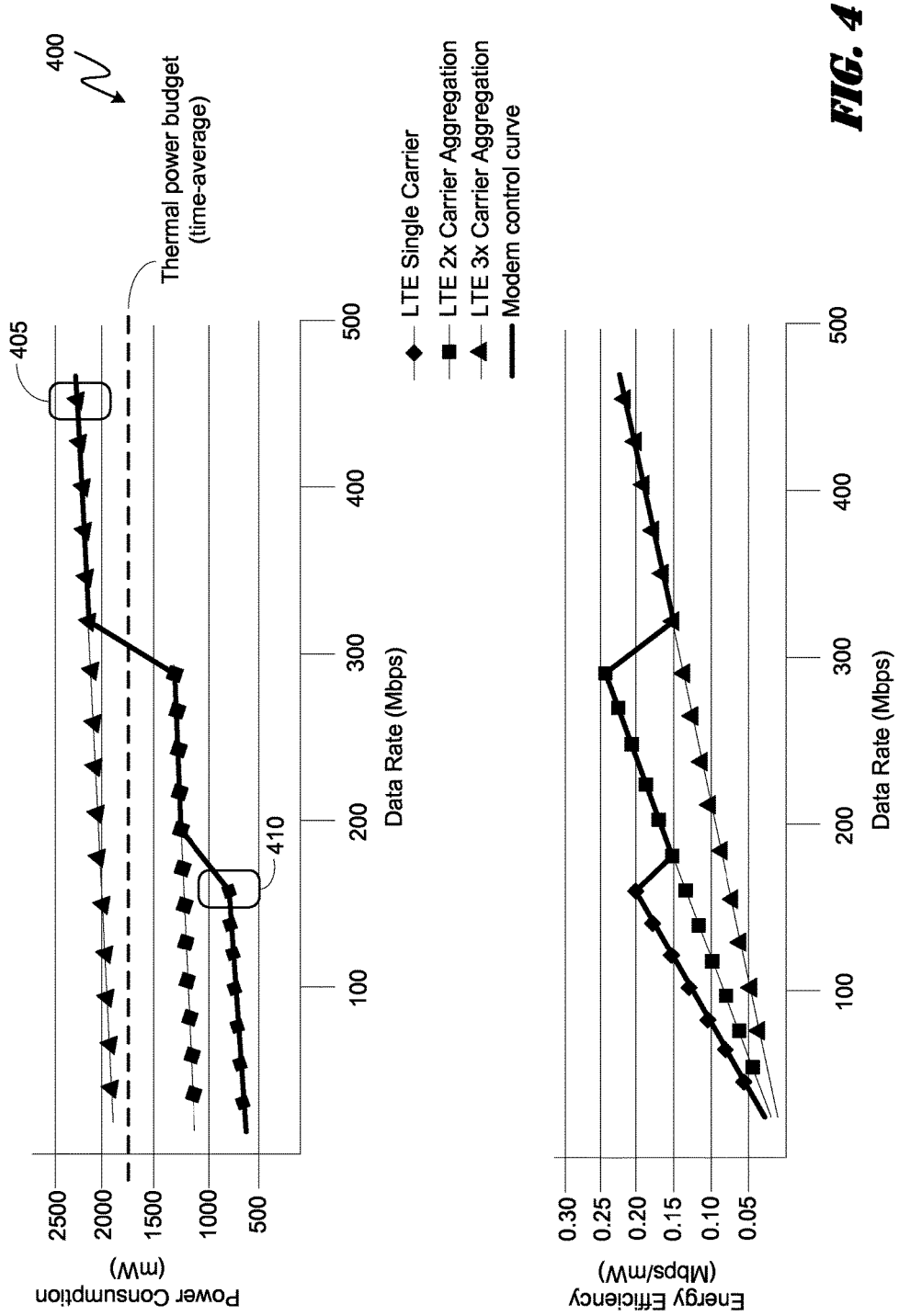
FIG. 4 is a pair of complimentary graphs illustrating an exemplary modem management strategy based on a key performance indicator ("KPI") of maximizing the percentage of time at which the modem is performing at a peak data rate.

FIG. 4 is a pair of complimentary graphs 400 illustrating an exemplary modem management strategy based on a key performance indicator ("KPI") of maximizing the percentage of time at which the modem is performing at a peak data rate. A KPI-based modem management strategy that controls a modem based on a KPI for maximizing the percentage of time at which the modem is performing at a peak data rate may be useful in scenarios such as, but not limited to, a demonstration mode for carrier aggregation and maximum speed capabilities. A demonstration use case may, for example, be recognized by the monitor module 114 and trigger the MMC module 101 to implement a modem management strategy that optimizes QoS in view of the appropriate KPI. Alternatively, it is envisioned that a user may manually select the KPI in lieu of an automatic selection.

Referring to the graphs 400, an exemplary modem 169 may be managed by an MMC module 101 according to a KPI for maximizing the percentage of time at which the modem is performing at a peak data rate and within the bounds of the modem control curve. The top graph of FIG. 4 maps power consumption (y-axis) against data rate (x-axis) for a given LTE modem 169. The bottom graph of FIG. 4 maps energy efficiency (y-axis) against data rate (x-axis) for the same exemplary LTE modem 169. As can be understood from the upper graph, a modem management strategy may drive the modem 169 to point 405 associated with a triple carrier aggregation level and keep it there for as long as possible before toggling the modem set point down to a much lower point 410 associated with a LTE single carrier bandwidth. In this way, the exemplary modem management strategy may allow the modem data rate to reside at the maximum rate 405 for as long as possible without the average power consumption over a period of time exceeding a thermal power budget level (as indicated by the dashed line in the upper graph).

Stated another way, the exemplary KPI-based modem management algorithm may utilize the maximum available carrier aggregation allowed by a local eNodeB in the cellular network so long as a maximum temperature threshold associated with the modem 169 is not exceeded. When the temperature threshold is exceeded, the exemplary KPI-based modem management algorithm may reduce the carrier aggregation level, thereby reducing power consumption and allowing the modem to cool before resuming data transmission at the highest data rate.

Figure 5:
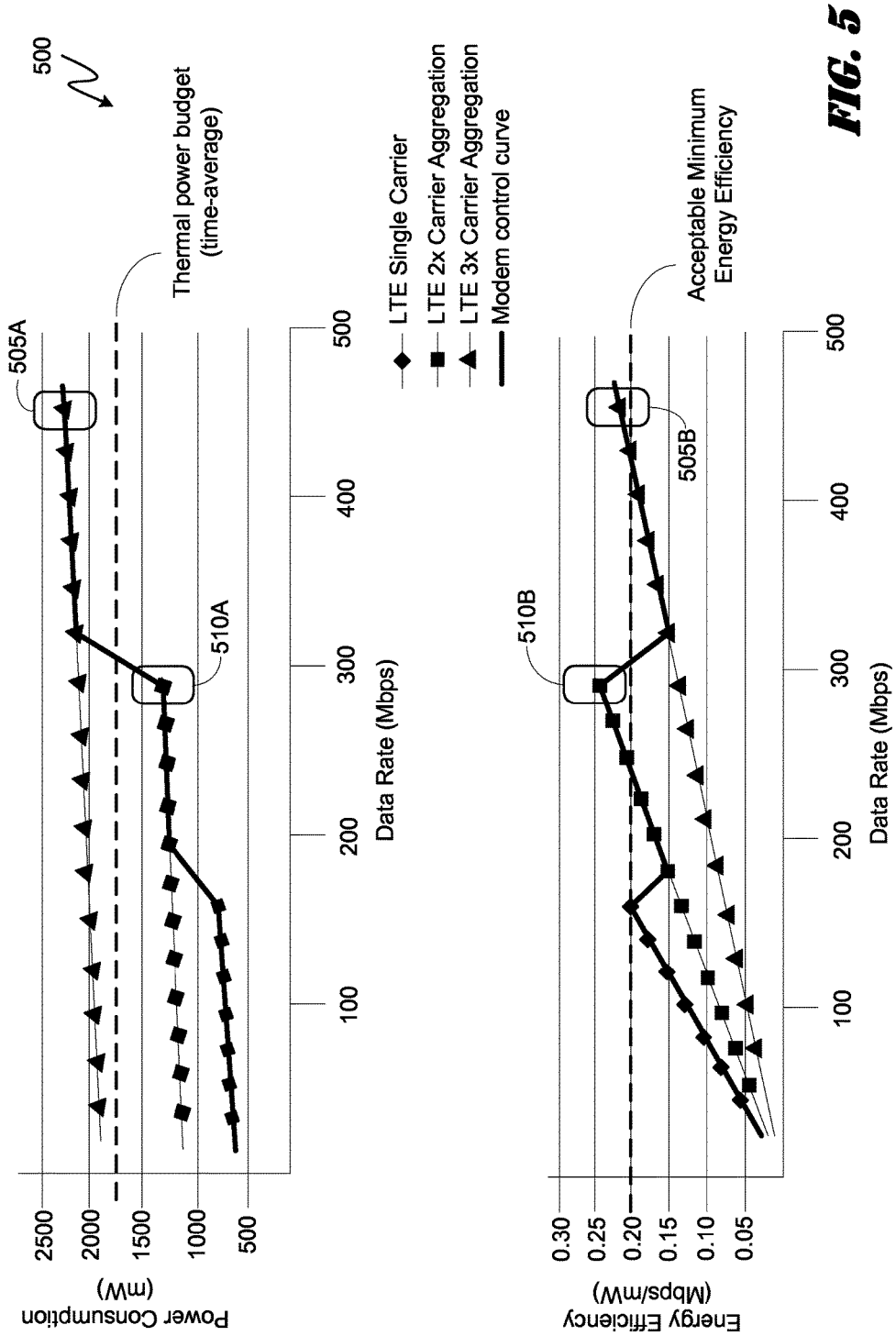
FIG. 5 is a pair of complimentary graphs illustrating an exemplary modem management strategy based on a key performance indicator ("KPI") of maximizing the average data rate.

FIG. 5 is a pair of complimentary graphs 500 illustrating an exemplary modem management strategy based on a key performance indicator ("KPI") of maximizing the average data rate. A KPI-based modem management strategy that controls a modem based on a KPI for maximizing the average data rate may be useful in scenarios such as, but not limited to, downloading a large multimedia file. Downloading a large multimedia file may, for example, be recognized by the monitor module 114 and trigger the MMC module 101 to implement a modem management strategy that optimizes QoS in view of the appropriate KPI. Alternatively, it is envisioned that a user may manually select the KPI in lieu of an automatic selection.

Referring to the graphs 500, an exemplary modem 169 may be managed by an MMC module 101 according to a KPI for maximizing the average data rate throughput and within the bounds of the modem control curve. The top graph of FIG. 5 maps power consumption (y-axis) against data rate (x-axis) for a given LTE modem 169. The bottom graph of FIG. 5 maps energy efficiency (y-axis) against data rate (x-axis) for the same exemplary LTE modem 169. As can be understood from the upper graph, a modem management strategy may drive the modem 169 to point 505 associated with a triple carrier aggregation level and then toggle the modem set point down to a point 510 associated with a LTE double carrier bandwidth. In this way, the exemplary modem management strategy may allow the modem data rate to average at a highest rate without the average power consumption over a period of time exceeding a thermal power budget level (as indicated by the dashed line in the upper graph) or the average minimum efficiency falling below a target floor (as indicated by the dashed line in the lower graph).

Stated another way, the exemplary KPI-based modem management algorithm may limit the LTE mode and data rate to the operating range that keeps the energy efficiency of the modem 169 above a minimum threshold.

Figure 6:
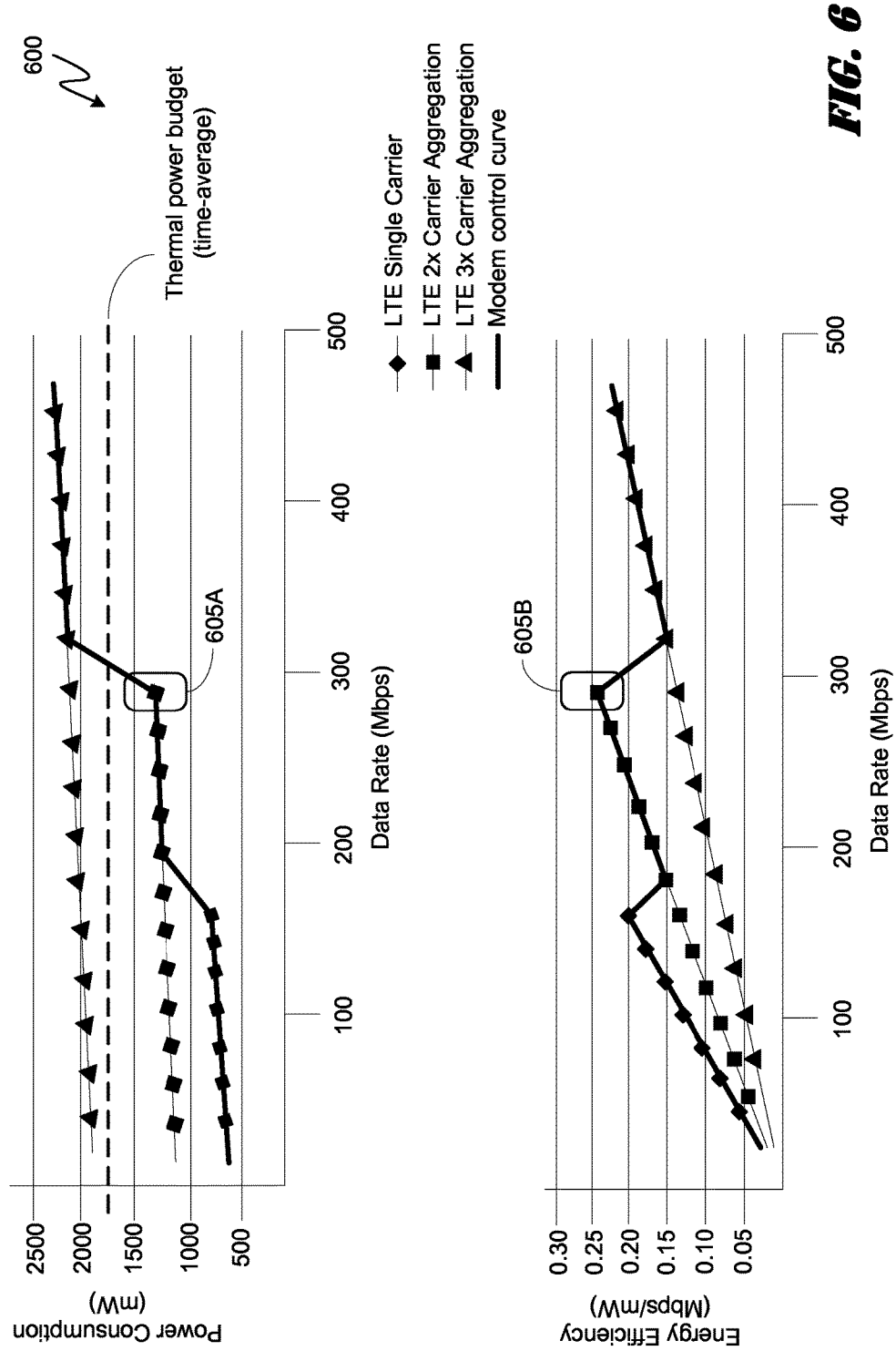
FIG. 6 is a pair of complimentary graphs illustrating an exemplary modem management strategy based on a key performance indicator ("KPI") of maximizing energy efficiency.

FIG. 6 is a pair of complimentary graphs 600 illustrating an exemplary modem management strategy based on a key performance indicator ("KPI") of maximizing energy efficiency. A KPI-based modem management strategy that controls a modem based on a KPI for maximizing energy efficiency may be useful in scenarios such as, but not limited to, low battery capacity. Low battery capacity or a screen "off" status may, for example, be recognized by the monitor module 114 and trigger the MMC module 101 to implement a modem management strategy that optimizes QoS in view of the appropriate KPI. Alternatively, it is envisioned that a user may manually select the KPI in lieu of an automatic selection.

Referring to the graphs 600, an exemplary modem 169 may be managed by an MMC module 101 according to a KPI for maximizing energy efficiency and within the bounds of the modem control curve. The top graph of FIG. 6 maps power consumption (y-axis) against data rate (x-axis) for a given LTE modem 169. The bottom graph of FIG. 6 maps energy efficiency (y-axis) against data rate (x-axis) for the same exemplary LTE modem 169. As can be understood from the upper graph, a modem management strategy may drive the modem 169 to point 605 associated with an LTE double carrier aggregation bandwidth. In this way, the exemplary modem management strategy may set the modem data rate to a speed that will not cause the average power consumption over a period of time to exceed a thermal power budget level (as indicated by the dashed line in the upper graph) and provides the highest energy efficiency per data amount transmitted.

Stated another way, the exemplary KPI-based modem management algorithm may limit the LTE mode and data rate to the one operating point associated with the best energy efficiency.

Figure 7:
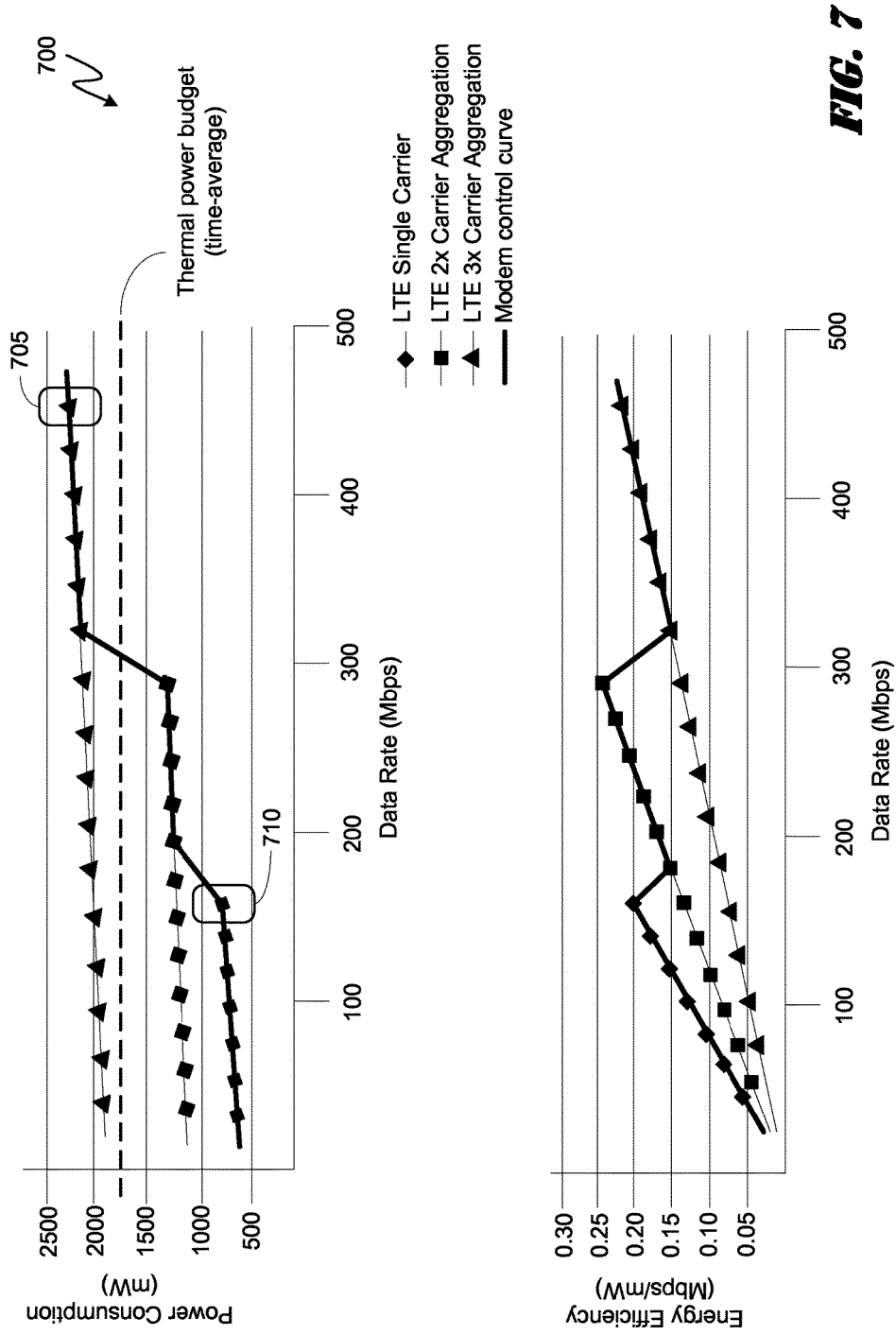
FIG. 7 is a pair of complimentary graphs illustrating an exemplary modem management strategy based on a key performance indicator ("KPI") of minimizing the rate of mode transitions.

FIG. 7 is a pair of complimentary graphs 700 illustrating an exemplary modem management strategy based on a key performance indicator ("KPI") of minimizing the rate of mode transitions. A KPI-based modem management strategy that controls a modem based on a KPI for minimizing the rate of mode transitions may be useful in scenarios such as, but not limited to, a user preference.

Referring to the graphs 700, an exemplary modem 169 may be managed by an MMC module 101 according to a KPI for minimizing the rate of mode transitions and within the bounds of the modem control curve. The top graph of FIG. 7 maps power consumption (y-axis) against data rate (x-axis) for a given LTE modem 169. The bottom graph of FIG. 7 maps energy efficiency (y-axis) against data rate (x-axis) for the same exemplary LTE modem 169. As can be understood from the upper graph, a modem management strategy may drive the modem 169 to point 705 associated with an LTE triple aggregation bandwidth and then toggle the modem down to point 710 in order to keep the average power consumption over a period of time below a thermal power budget level (as indicated by the dashed line in the upper graph). To minimize the frequency of toggles between set points 705 and 710, the exemplary modem management strategy may reduce the thermal power budget level and/or reduce a temperature threshold associated with the modem 169 and/or increase a timer value for maintaining the set point at 710. In these ways, the exemplary modem management strategy may drive the modem to remain at the LTE single carrier point of 710 for as long as possible before conditions allow a ramp up to point 705. Notably, while the data rate throughput may be severely throttled by such a modem management strategy, the QoS experienced by the user may be enhanced in view of the KPI for minimizing LTE speed mode transitions (The user may not experience many modem speed transitions that adversely impact user experience).

The plots of power consumption and energy efficiency in FIGS. 3, 4, 5, 6, and 7 are examples and may vary depending on system designs (modem chip design, RF/PA chipset design) and communication network status (distance between the mobile system and the base station, RF signal strength or each carrier frequency band, frequency bands used for carrier aggregation), as one of ordinary skill in the art would understand. In some other designs or communication network status, it is envisioned that a case of $3x$ carrier aggregation or single carrier may provide better energy efficiency. The optimal operating point may be different in different power consumption and energy efficiency trends based on the same modem management and control strategy explained above.

Figure 8:
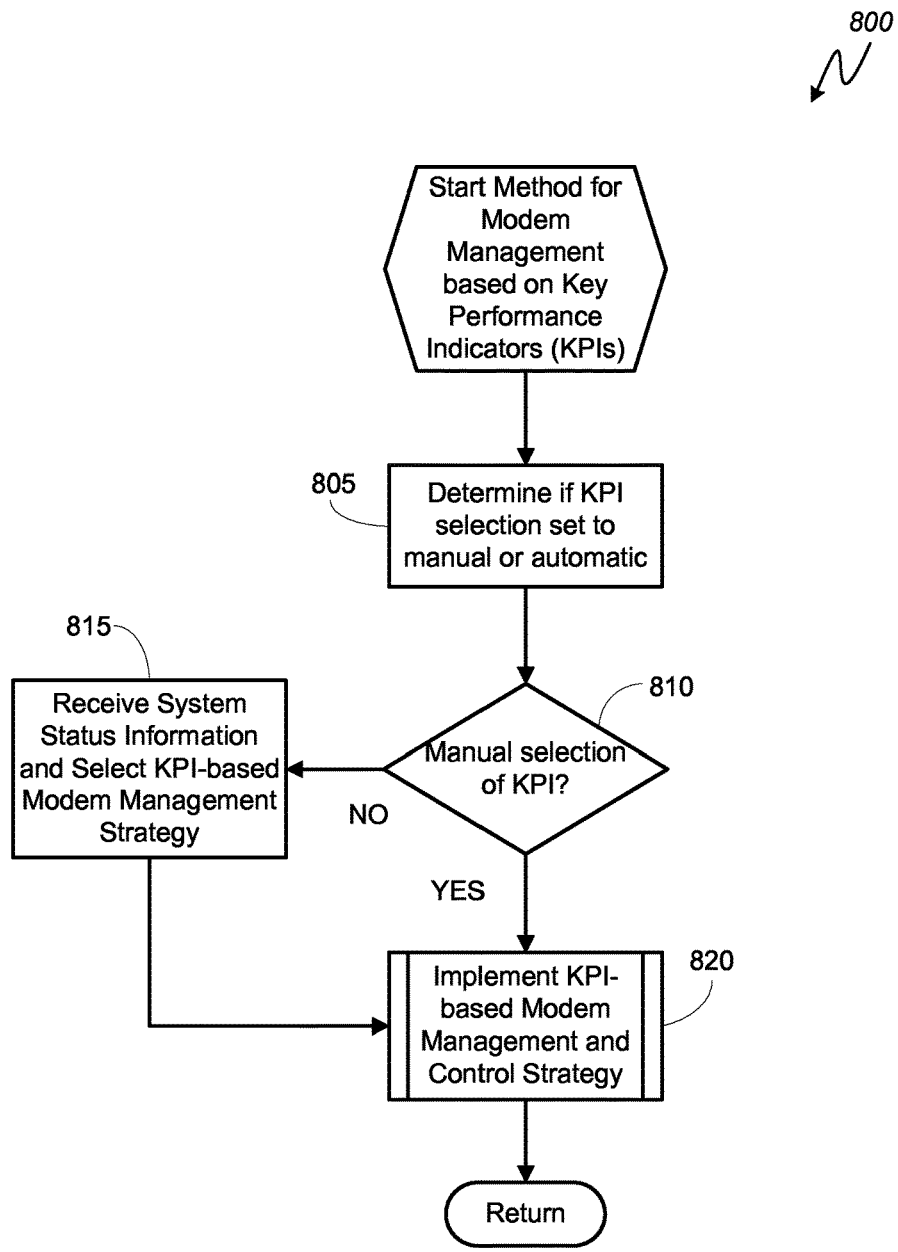
FIG. 8 is a logical flowchart illustrating an embodiment of a method for modem management based on key performance indicators.

FIG. 8 is a logical flowchart illustrating an embodiment of a method 800 for modem management based on key performance indicators. Beginning at block 805, the modem management and control ("MMC") module 101 may determine if the user has manually selected a KPI or if the system is set for automatic recognition of a KPI. At decision block 810, if the user has manually selected a KPI then the "yes" branch is followed to block 820 and the MMC module 101 selects and implements a modem management strategy associated with the user-selected KPI. Alternatively, if the system is set for automatic determination of a KPI, the method 800 may proceed from decision block 810 via the "no" branch to block 815. At block 815, the MMC module 101, working with the monitor module 114, may receive system status information and, from the information, determine an appropriate KPI. The method 800 proceeds to block 820 and the MMC module 101 selects and implements a modem management strategy associated with the automatically selected KPI. The method 800 returns.

Figure 9:
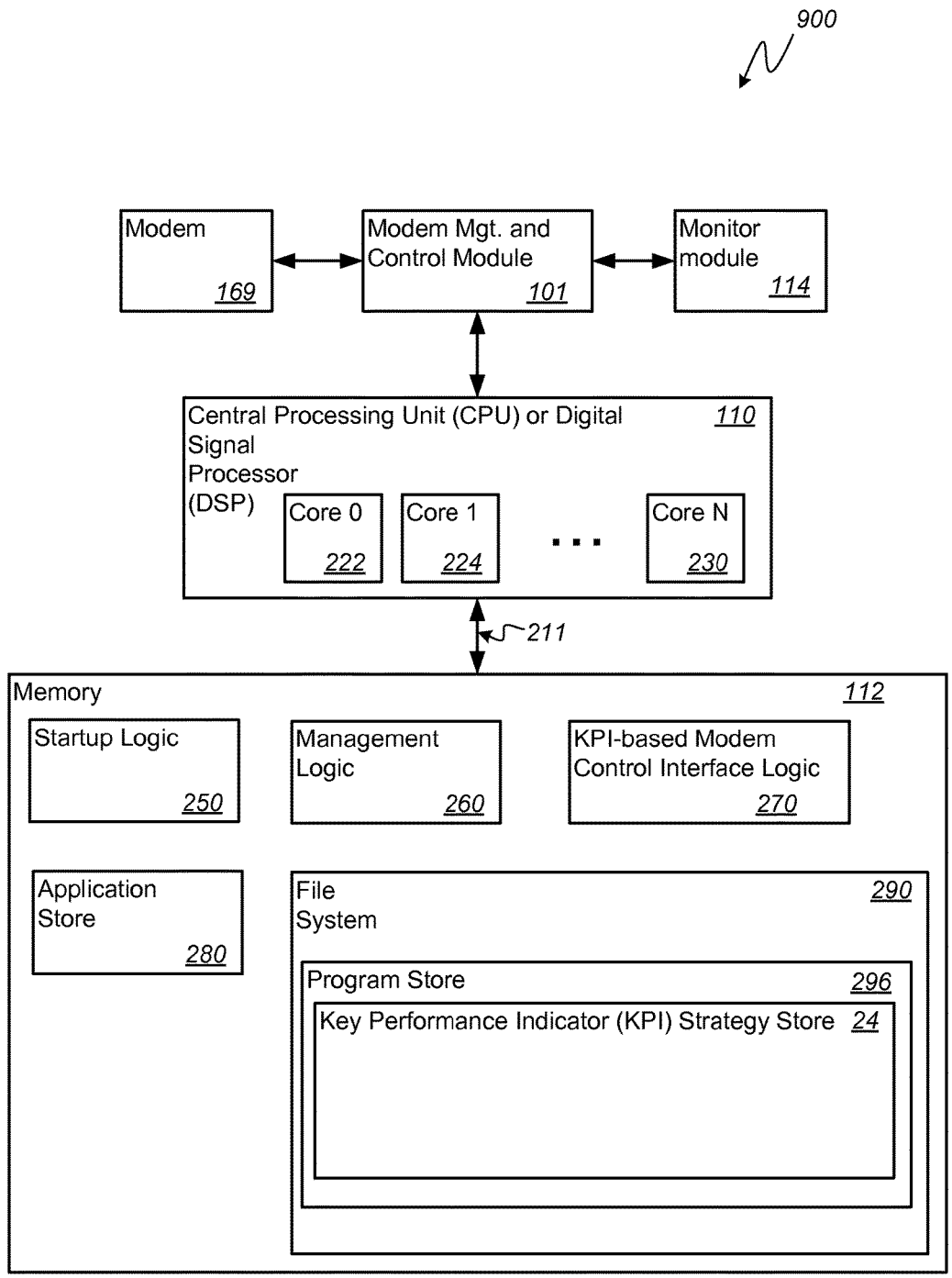
FIG. 9 is a schematic diagram illustrating an exemplary software architecture of the PCD of FIG. 2 for supporting modem management based on various KPI-based strategies.

FIG. 9 is a schematic diagram illustrating an exemplary software architecture of the PCD of FIG. 2 for supporting modem management based on various KPI-based strategies. As illustrated in FIG. 9, the CPU or digital signal processor 110 is coupled to the memory 112 via a bus 211. The CPU 110, as noted above, may be a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous processor, may provide differing levels of performance under similar operating conditions. Alternatively, one or more modem management related applications or programs can be distributed for processing across two or more of the available heterogeneous cores.

The CPU 110 may receive commands from the MMC module(s) 101 that may comprise software and/or hardware. If embodied as software, the MMC module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 9, it should be noted that one or more of startup logic 250, management logic 260, KPI-based modem management and control interface logic 270, applications in application store 280 and portions of the file system 290 may be stored on any computer-readable medium 112 for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor (or additional processor cores).

The startup logic 250 includes one or more executable instructions for selectively identifying, loading, and executing a select algorithm for KPI-based modem management.

The management logic 260 includes one or more executable instructions for terminating KPI-based modem management strategy, as well as selectively identifying, loading, and executing a more suitable replacement program for KPI-based modem management. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor, may operate in accordance with one or more signals provided by the MMC module 101 and monitor module 114. In this regard, the monitor module 114 may provide one or more indicators of events, processes, applications, resource status conditions, elapsed time, temperature, etc in response to control signals originating from the MMC module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to default to a temperature based modem management strategy when a temperature measurement associated with skin temperature exceeds a certain identified threshold.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged key performance indicator strategy store 24. In this regard, the file system 290 may include a reserved section of its total file system capacity for the storage of information associated with the various KPI-based modem management algorithms.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for management of a modem in a portable computing device, wherein the modem is operable to aggregate multiple carrier bandwidths, the method comprising:
   receiving an input of a key performance indicator for the portable computing device selected from a plurality of performance indicators comprising two or more of lower device temperature, maximization of the percentage of time that the modem is operating at a maximum speed, maximization of the average data throughput of the modem, maximizing energy efficiency, and minimizing speed transitions of the modem over a duration of time;
   based on the received key performance indicator, determining a modem management and control strategy for the modem; and
   implementing the modem management and control strategy, wherein implementing the modem management and control strategy comprises:
      for a first period of time, determining a first number of carrier bandwidths to aggregate with the modem to adjust a modem performance level such that the key performance indicator is at a desired level and an average power consumption level during the first period of time does not exceed a thermal power budget level; and
      for a second period of time, determining a second number of carrier bandwidths to aggregate with the modem to adjust the modem performance level such that the key performance indicator is at the desired level and the average power consumption during the second period of time does not exceed the thermal power budget level, wherein the second number of carrier bandwidths is different from the first number of carrier bandwidths.

2. The method of claim 1, wherein the input of a key performance indicator is a manual input by a user of the portable computing device.

3. The method of claim 1, wherein the input of a key performance indicator is an automatic input determined based on system status information.

4. The method of claim 3, wherein the system status information comprises one or more of current leakage, operating voltage, modem performance mode, data rate level, active use case, running application, on/off status of a display component, battery capacity, temperature sensor reading, channel band usage, and transmission signal strength.

5. The method of claim 1, wherein the modem performance level is defined by a modem data transfer rate.

6. A computer system for management of a modem in a portable computing device, wherein the modem is operable to aggregate multiple carrier bandwidths, the system comprising:
   a modem management and control module comprising a processor in communication with an analog-to-digital converter controller, the modem management and control module configured for:
   receiving an input of a key performance indicator for the portable computing device selected from a plurality of performance indicators comprising two or more of lower device temperature, maximization of the percentage of time that the modem is operating at a maximum speed, maximization of the average data throughput of the modem, maximizing energy efficiency, and minimizing speed transitions of the modem over a duration of time;
   based on the received key performance indicator, determining a modem management and control strategy for the modem; and
   implementing the modem management and control strategy, wherein implementing the modem management and control strategy comprises:
      for a first period of time, determining a first number of carrier bandwidths to aggregate with the modem to adjust a modem performance level such that the key performance indicator is at a desired level and an average power consumption level during the first period of time does not exceed a thermal power budget level; and
      and
      for a second period of time, determining a second number of carrier bandwidths to aggregate with the modem to adjust the modem performance level such that the key performance indicator is at the desired level and the average power consumption during the second period of time does not exceed the thermal power budget level, wherein the second number of carrier bandwidths is different from the first number of carrier bandwidths.

7. The computer system of claim 6, wherein the input of a key performance indicator is a manual input by a user of the portable computing device.

8. The computer system of claim 6, wherein the input of a key performance indicator is an automatic input determined based on system status information.

9. The computer system of claim 8, wherein the system status information comprises one or more of current leakage, operating voltage, modem performance mode, data rate level, active use case, running application, on/off status of a display component, battery capacity, temperature sensor reading, channel band usage, and transmission signal strength.

10. The computer system of claim 6, wherein the modem performance level is defined by a modem data transfer rate.

11. The computer system of claim 6, wherein the portable computing device is in the form of a wireless telephone.

12. A computer system for management of a modem in a portable computing device, wherein the modem is operable to aggregate multiple carrier bandwidths, the system comprising:
   means for receiving an input of a key performance indicator for the portable computing device selected from a plurality of performance indicators comprising two or more of lower device temperature, maximization of the percentage of time that the modem is operating at a maximum speed, maximization of the average data throughput of the modem, maximizing energy efficiency, and minimizing speed transitions of the modem over a duration of time;
   means for determining a modem management and control strategy for the modem based on the received key performance indicator; and means for implementing the modem management and control strategy, wherein implementing the modem management and control strategy comprises:

for a first period of time, determining a first number of carrier bandwidths to aggregate with the modem to adjust a modem performance level such that the key performance indicator is at a desired level and an average power consumption level during the first period of time does not exceed a thermal power budget level; and for a second period of time, determining a second number of carrier bandwidths to aggregate with the modem to adjust the modem performance level such that the key performance indicator is at the desired level and the average power consumption during the second period of time does not exceed the thermal power budget level, wherein the second number of carrier bandwidths is different from the first number of carrier bandwidths.

13. The computer system of claim 12, wherein the input of a key performance indicator is a manual input by a user of the portable computing device.

14. The computer system of claim 12, wherein the input of a key performance indicator is an automatic input determined based on system status information.

15. The computer system of claim 14, wherein the system status information comprises one or more of current leakage, operating voltage, modem performance mode, data rate level, active use case, running application, on/off status of a display component, battery capacity, temperature sensor reading, channel band usage, and transmission signal strength.

16. The computer system of claim 12, wherein the modem performance level is defined by a modem data transfer rate.

17. The computer system of claim 12, wherein the portable computing device is in the form of a wireless telephone.

18. A non-transitory computer-readable medium having a computer readable program code embodied therein, said computer readable program code adapted to be executed to implement a method for management of a modem in a portable computing device, wherein the modem is operable to aggregate multiple carrier bandwidths, said method comprising:

receiving an input of a key performance indicator for the portable computing device selected from a plurality of performance indicators comprising two or more of lower device temperature, maximization of the percentage of time that the modem is operating at a maximum speed, maximization of the average data throughput of the modem, maximizing energy efficiency, and minimizing speed transitions of the modem over a duration of time;

based on the received key performance indicator, determining a modem management and control strategy for the modem; and implementing the modem management and control strategy, wherein implementing the modem management and control strategy comprises:

for a first period of time, determining a first number of carrier bandwidths to aggregate with the modem to adjust a modem performance level such that the key performance indicator is at a desired level and an average power consumption level during the first period of time does not exceed a thermal power budget level; and for a second period of time, determining a second number of carrier bandwidths to aggregate with the modem to adjust the modem performance level such that the key performance indicator is at the desired level and the average power consumption during the second period of time does not exceed the thermal power budget level, wherein the second number of carrier bandwidths is different from the first number of carrier bandwidths.

19. The non-transitory computer-readable medium of claim 18, wherein the input of a key performance indicator is a manual input by a user of the portable computing device.

20. The non-transitory computer-readable medium of claim 18, wherein the input of a key performance indicator is an automatic input determined based on system status information.

21. The non-transitory computer-readable medium of claim 20, wherein the system status information comprises one or more of current leakage, operating voltage, modem performance mode, data rate level, active use case, running application, on/off status of a display component, battery capacity, temperature sensor reading, channel band usage, and transmission signal strength.

22. The non-transitory computer-readable medium of claim 18, wherein the modem performance level is defined by a modem data transfer rate.

* * * * *